(12) United States Patent
Ugolini

(10) Patent No.: US 6,910,348 B2
(45) Date of Patent: Jun. 28, 2005

(54) MACHINE FOR PRODUCING ICED BEVERAGES AND THE LIKE HAVING AN IMPROVED DISPENSING DEVICE

(75) Inventor: Marco Ugolini, Milan (IT)

(73) Assignee: Ugolini S.p.A. (IT)

( * ) Notice: Subject to any disclaimer, the term of this patent is extended or adjusted under 35 U.S.C. 154(b) by 300 days.

(21) Appl. No.: 10/207,322

(22) Filed: Jul. 30, 2002

(65) Prior Publication Data

US 2004/0020234 A1 Feb. 5, 2004

(51) Int. Cl.⁷ .................................................. B67D 5/62
(52) U.S. Cl. ..................................... 62/392; 222/146.6
(58) Field of Search .......................... 62/338, 389, 391, 62/392; 222/146.6

(56) References Cited

U.S. PATENT DOCUMENTS 5,619,901 A     4/1997   Reese et al.

FOREIGN PATENT DOCUMENTS

| CH | 443 375 A | 9/1967 |
|----|-----------|--------|
| EP | 0154 308  | 9/1985 |
| FR | 1 516448  | 3/1968 |
| WO | WO 95/16134 | 6/1995 |

*Primary Examiner*—Denise L. Esquivel
*Assistant Examiner*—Malik N. Drake
(74) *Attorney, Agent, or Firm*—Shlesinger, Fitzsimmons & Shlesinger

(57) ABSTRACT

A machine (10) for making products such as iced beverages and the like comprises a tank (11) to contain the product in which cooling means (12) and stirring means (13) are present. The tank comprises a product-dispensing tap (14) having a slidable piston (15) and which is provided with sealing elements (17, 18) to offer a hydraulic outward seal to the tank when the tap is in a closed condition. The piston portion (23) between the sealing elements and in contact with the product in the tank has a reduced section to form regions (19) of free circulation of the product around the piston. The tank may comprise surfaces (20) for conveying the product towards such regions so as to facilitate circulation thereof. Thus the product stagnation that may cause bacteria and pollutant formation is avoided and the cleaning operation with use of sanitising solutions is facilitated.

10 Claims, 2 Drawing Sheets

MACHINE FOR PRODUCING ICED BEVERAGES AND THE LIKE HAVING AN IMPROVED DISPENSING DEVICE

BACKGROUND OF THE INVENTION

The present invention relates to a machine for producing iced beverages (water-ices and the like), of the type comprising a tank containing the beverage and in which a cooling element and a stirring element for circulation of the beverage are present. The tank further comprises a dispensing tap from which the beverage to be served is drew off.

Since these machines are intended for food use, obviously the hygienic conditions of the product must be ensured. From this point of view an element causing many problems is the dispensing tap. In fact, in the machines of the known art, the tap that is generally made as a mere cylindrical slidable piston and is operated by an outer lever, has regions into which the beverage penetrates and stagnates and cleaning of which is made difficult. These regions in a short period of time become a breeding-ground for bacteria and give rise to pollution of the product.

The risky regions in a tap were found to be substantially two.

The first region is identified by the interface between the side wall of the piston and the seat in which the piston slides; the liquid penetrating through this gap inevitably stagnates and since it is no longer cooled, it is subjected to quick deterioration. In the known art attempts were made to solve this problem by making the volume of this gap increasingly smaller through reduction of the play between the piston and seat as much as possible, trying to substantially eliminate the amount of stagnating liquid. Unfortunately even very small amounts of stagnating liquid generate bacteria over time.

The second region that appeared to be a source of pollution is represented by a region beyond the sealing elements surrounding the sliding piston, towards the fitting end of the operating lever. In this region, due to inevitable laminar leakage of the product—also caused by sliding of the piston during the tap working—there is always the presence of some product that is subjected to degradation thereby producing bacteria. In addition, due to sliding of the piston a bacteria-dragging action from such a region to the inside of the tank is produced. The solution proposed in the known art is obviously that of making seals between the tap and seat as much efficient as possible and again of reducing the stagnation region to the minimum. These solutions too appeared to be unsatisfactory.

On the other hand, the product difficulty in penetrating into the stagnation regions does not inhibit stagnation, but it only hinders the efficiency of the periodical sanitising operation on the apparatus. In fact, this operation is generally carried out by introducing an appropriate disinfectant solution into the tank. Since the residence time of the solution in the tank is much more limited than the residence time of the product, the more attempts are made to make the product leakage in the stagnation regions difficult, the more reaching of the stagnation regions themselves is unlikely to occur during the limited period of time for execution of the disinfecting operation.

It is a general aim of the present invention to obviate the above mentioned drawbacks by providing a machine of the mentioned type that however has a dispensing tap avoiding the above problems concerning bacteria production and pollution of the product.

SUMMARY OF THE INVENTION

In view of the above aim in accordance with the invention a machine for production of products such as iced beverages and the like has been conceived which comprises a tank to contain the product in which cooling means and stirring means for the product are present, the tank comprising a product-dispensing tap having a slidable piston and which is provided with sealing elements that are spaced apart along the piston axis to offer a hydraulic outward seal to the tank when the tap is in a closed condition, the piston portion between the sealing elements and in contact with the product in the tank having a reduced section to form regions of free circulation of the product around the piston.

BRIEF DESCRIPTION OF THE DRAWINGS

For better explaining the innovative principles of the present invention and the advantages it offers as compared with the known art, a possible embodiment applying said principles will be described hereinafter by way of example, with the aid of the accompanying drawings. In the drawings.

DETAILED DESCRIPTION OF THE INVENTION

Figure 1:
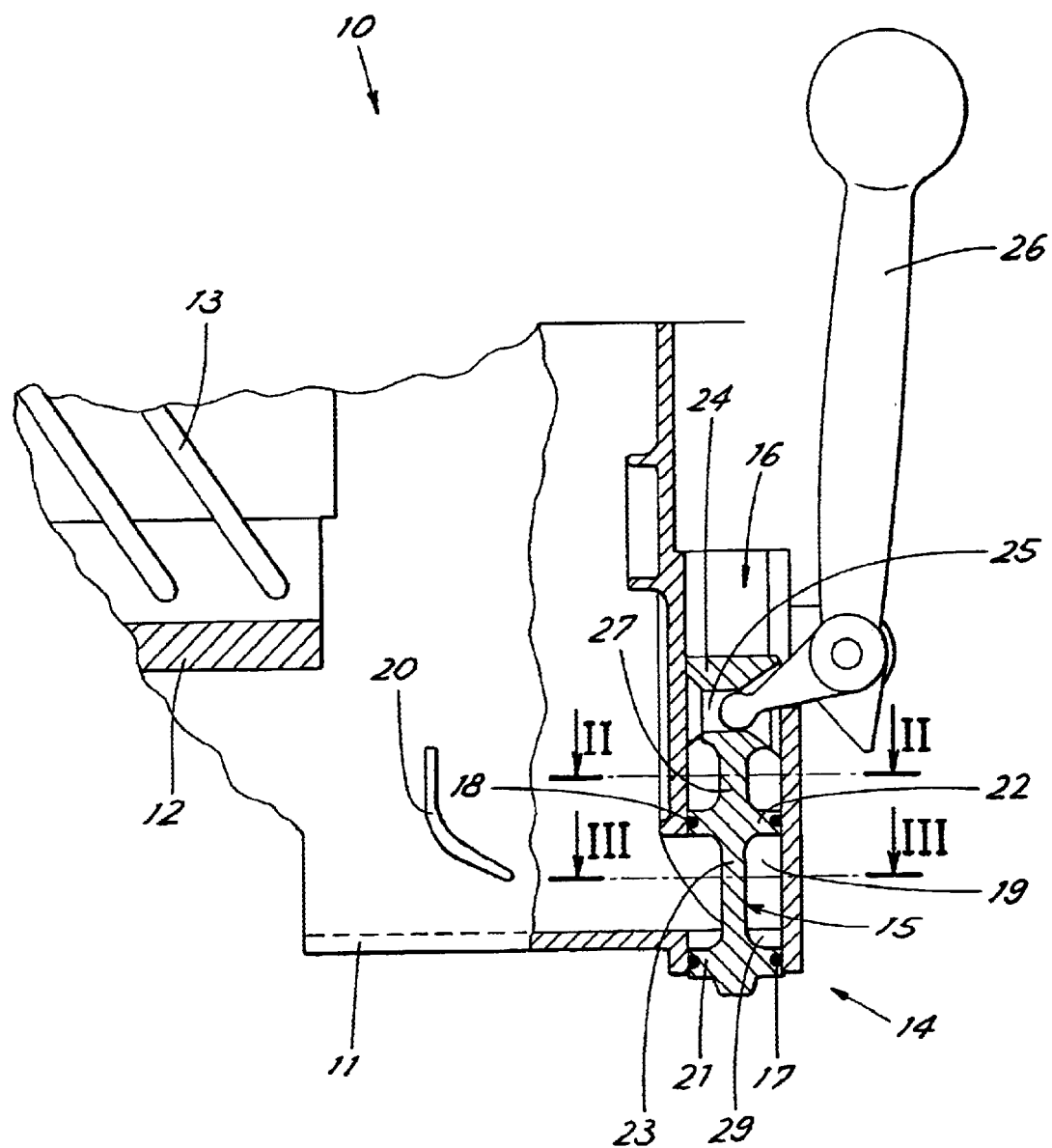
FIG. 1 is a partial and partly sectional diagrammatic view of a machine in accordance with the invention.

With reference to the drawings, diagrammatically and partly shown in FIG. 1 is a machine 10 for production of products such as iced beverages and the like, which comprises a tank 11 (usually of transparent material and provided with an upper lid, not shown) to contain the product. Cooling means 12 and stirring means 13 for the product are present in the tank. According to a substantially known art, the cooling means may take the form of a cylindrical evaporator of a cooling circuit and the stirring means may consist of a spiral screw rotating in coaxial relationship with the evaporator. Since these elements of the machine are part of the known art and therefore can be easily imagined by a person skilled in the art, they will not be herein further described.

The tank comprises a product-dispensing tap 14 having a substantially cylindrical vertical body and comprising a piston 15 slidable in a corresponding seat 16 in the tank. The piston is provided with sealing elements 17, 18 spaced apart along the piston axis to offer a hydraulic inward seal to the tank when the tap is in a closed condition (as shown in FIG. 1). Upon an upward movement of the piston the product-dispensing mouth 29 is opened.

Figure 3:
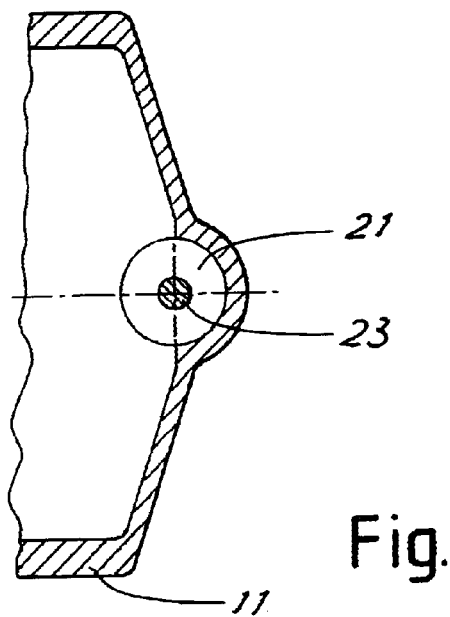
FIG. 3 is a partial sectional view taken along line III—III in FIG. 1.

As clearly viewed from FIGS. 1 and 3, the piston portion located between the sealing elements and therefore in contact with the product in the tank has a reduced section to form regions 19 of free circulation of the product around the piston. Advantageously, the tank internally comprises surfaces 20 for conveying the product towards such regions of free circulation.

Figure 2:
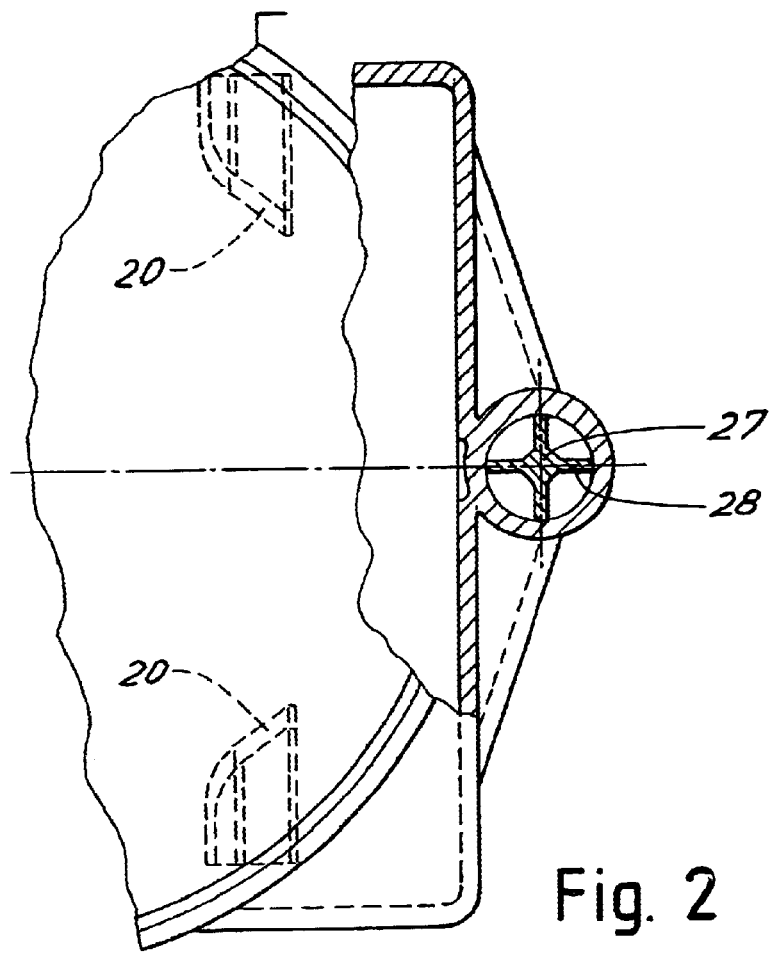
FIG. 2 is a partial sectional view taken along line II—II in FIG. 1.

In the advantageous embodiment herein described, the piston is in the form of two disks 21, 22 peripherally carrying the sealing elements and connected to each other by a stem 23 embodying the piston portion of reduced section. Stem 23 extends at 27 beyond the upper disk 22 and becomes wider to form an end 24 with a seat 25 for connection of a working lever 26 for the tap. For structure strengthening without preventing air circulation, the extension 27 of stem 23 is provided with radial reinforcing fins 28 also performing the function of piston guides in the piston seat, as clearly shown in FIG. 2.

At this point it is apparent that the intended purposes are achieved. The free circulation of the product around the piston avoids stagnation and at the same time allows easy and quick sanitisation by means of appropriate liquids. The product within the tap is also always cooled during the machine operation so that degradation of the product is therein avoided.

The side space at the upper end of the piston and the free circulation in the seat receiving this upper end enables quick drying of the laminar product leakage through the upper seal so that in this region too formation of bacteria and pollutants is prevented.

Obviously, the above description of an embodiment applying the innovative principles of the present invention is given by way of example only and therefore must not be considered as a limitation of the scope of the invention as herein claimed. For example, the exact conformation of the machine and the different accessories with which it is equipped can vary depending on specific requirements and preferences, as can be easily understood by a person skilled in the art.

What is claimed is:

1. A machine for production of iced beverage products comprising a tank to contain the product in which cooling means and stirring means for the product are present, the tank comprising a product-dispensing tap that comprises a slidable piston provided with sealing elements that are spaced apart along the piston axis to each offer a hydraulic outward seal to the tank when the tap is in a closed condition, the piston portion between the sealing elements and in contact with the product in the tank having a reduced section to form regions of free circulation of the product around the piston portion.

2. A machine as claimed in claim 1, characterised in that the tank internally comprises surfaces for conveying the product to said regions of free circulation.

3. A machine as claimed in claim 1, characterised in that the piston has one end facing an opening in the product-dispensing tank and an opposite end fitted in a working lever for sliding of the piston between a closed position and an open position of said opening in the tank, said opposite end being received with side gap in a seat open to the outside of the tank for air circulation in such a seat.

4. A machine as claimed in claim 3, characterised in that said opposite end of the piston comprises a portion provided with a fitting seat for said working lever and a second portion of reduced diameter disposed between the first portion and a sealing element of the piston.

5. A machine as claimed in claim 1, characterised in that the piston is in the form of two disks, peripherally carrying the sealing elements and connected to each other by a stem embodying said piston portion of reduced section.

6. A machine as claimed in claim 5, characterised in that the stem extends beyond the upper disk and becomes wider to form the connecting end of a working lever of the tap.

7. A machine as claimed in claim 6, characterised in that said stem extension beyond the upper disk is provided with radial reinforcing fins.

8. A machine as claimed in claim 1, characterised in that the piston is moveable between the closed position and an open position.

9. A machine as claimed in claim 8, characterised in that when the piston is in the open position, product in the tank can freely flow from the tank through an opening in the tank.

10. A machine as claimed in claim 8, wherein product freely circulates around the reduced section of the piston portion in the tank when the piston is in the closed position and when the piston is in the open position.

* * * * *